April 27, 1971  D. OBERSBY  3,576,611

RADIATION CONTROL MEANS FOR SHAPING TUBES

Filed July 10, 1967  3 Sheets-Sheet 1

Inventor
DEREK OBERSBY

By *Imirie & Smiley*
Attorneys

April 27, 1971     D. OBERSBY     3,576,611
RADIATION CONTROL MEANS FOR SHAPING TUBES
Filed July 10, 1967     3 Sheets-Sheet 3

Inventor
DEREK OBERSBY

United States Patent Office 3,576,611
Patented Apr. 27, 1971

3,576,611
RADIATION CONTROL MEANS FOR SHAPING TUBES
Derek Obersby, Stafford, England, assignor to Quickfit & Quartz Limited, Walton, Stone, England
Filed July 10, 1967, Ser. No. 652,352
Claims priority, application Great Britain, July 15, 1966, 31,977/66
Int. Cl. C03b; C03c
U.S. Cl. 65—162                                     14 Claims

ABSTRACT OF THE DISCLOSURE

In the manufacture of an article of vitreous material, heating the material, sensing a band of wave-lengths of radiation emitted by the material, and generating a signal to control heating and/or manipulation of the material when the signal reaches a predetermined magnitude.

BACKGROUND OF THE INVENTION

(1) Field of the invention

This invention comprises improvements in or relating to the manufacture of vitreous articles.

(2) Description of the prior art

In the manufacture of vitreous articles, for example in the manipulation of glass tubes, heat is applied to the vitreous material to "soften" it prior to manipulation. The skill of an operator has been relied upon hitherto in some processes for judging when the vitreous material has been heated sufficiently to permit manipulation; such manual techniques are, however, not satisfactory for mass production methods.

Automatic or semi-automatic treatment of vitreous material has been employed, but generally relies on a sequentially-controlled heating cycle to reach the softness required for initiating a manipulative operation. This, however, is unsatisfactory as it does not permit of the treatment of vitreous materials of different compositions, which can differ substantially in the amount of heating required before manipulation can be commenced. Moreover, where in such earlier processes radiation sensing devices are employed for sensing the radiation temperature of the heated vitreous material, these have proved to be affected by the heated surroundings, including for example the heating agency itself, thereby masking, in effect, the true radiant energy level of the material being heated.

SUMMARY

According to the present invention there is provided a method of manufacturing an article of vitreous material in which the material is heated and only thermal radiation emitted by the material in aparticular wave-length band is sensed to provide a signal which is utilised to control continuously the heating of the material and/or to initiate automatically a manipulative operation on the material when said signal reaches a predetermined magnitude.

By sensing said thermal radiation in a particular wave-length band the energy radiated by the material itself is sensed, and the method therefore ensures that vitreous material is raised to the same temperature or radiant energy level before initiation of a said manipulative operation, regardless of the ambient conditions or of differences of composition or dimensions of different vitreous materials or blanks formed therefrom.

The invention also comprehends apparatus for manufacturing articles of vitreous material from blanks thereof, said apparatus comprising a bed for receiving a blank, means for heating a said blank on said bed, a radiation sensing device disposed so as to receive thermal radiation emitted by a said blank on the bed, said sensing device being responsive to a particular wave-length band only of said radiation to provide a signal, and actuator means responsive to a predetermined magnitude of said signal to initiate automatically a manipulative operation on the heated blank or to adjust the rate of heating thereof.

The heating means may comprise a burner, and the flame provided by said burner may be controlled by regulating the fuel and/or oxidant supply thereto in response to said signal. Other forms of heating such, for example as electrical resistance heating, may conveniently be used.

The invention also includes a vitreous article manufactured by the method or apparatus herein described.

DESCRIPTION OF THE PREFERRED EMBODIMENT

Figure 1:
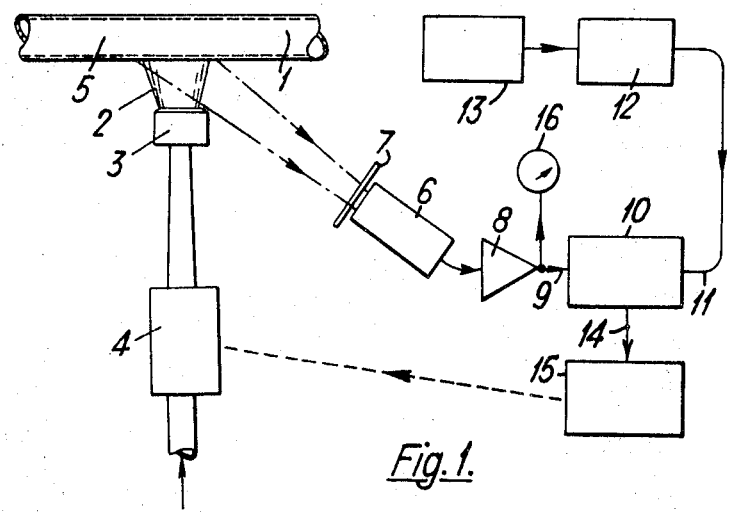
FIG. 1 shows in purely diagrammatic form and by way of example, apparatus according to one embodiment of the invention.

FIG. 1 shows in simplified diagrammatic form apparatus according to the invention for controlling the heating of a vitreous workpiece comprising in this example a glass tube 1. The tube 1 is mounted (by means not shown) for rotation about its longitudinal axis in a flame 2 produced by a burner 3. The supply of fuel and/or oxygen to the burner 3 is regulated by a control valve 4.

The flame 2 plays on a portion 5 of the tube 1 and thermal radiation emitted by this portion is sensed by a photo-electric radiation-sensing device 6 which may be arranged, as shown in FIG. 1, to "view" the portion 5 through the flame 2. A band-pass filter 7 is disposed between the device 6 and the flame 2 to admit to the device 6 only radiation within a particular wave-length band, in this case in the infra-red region. The pass band of the filter 7 is typically in the wavelength range of 7,000 to 10,000 angstrom units.

The photo-electric device 6 provides an electrical output signal dependent on the intensity of the detected radiation and representative of the temperature of the radiating portion 5 of the tube 1. After amplification in a voltage amplifier 8 this signal provides one input 9 to an electronic or electro-mechanical comparator 10, the other input 11 to which is a reference voltage signal derived from a programmer 12. The programmer 12 is supplied from a stabilised power supply 13 and can be adjusted to provide a reference signal at the comparator input 11 which is representative of a predetermined temperature to which the portion 5 is to be heated or a predetermined radiation intensity to be detected by the sensing device 6.

The comparator 10 operates in the conventional manner to provide an output 14 comprising an error voltage signal. This error signal has a magnitude which is proportional to the difference between the detected and reference signals on the respective comparator inputs 9, 11, and has a predetermined value, for example zero, when this difference is zero and the portion 5 is at the predetermined temperature. The output error signal is applied to an electro-mechanical servo-mechanism 15 which is connected to the control valve 4 of the burner 3.

The arrangement described above will be recognised as a servo-loop which regulates the heating of the portion 5 of the tube 1 in dependence of the temperature of said portion. The control valve 4 is in this example arranged to shut off the fuel and/or oxygen supply to the burner 3 when the portion 5 reaches said predetermined temperature, discontinuing the heating of the tube 1. Said predetermined temperature is typically a temperature at which the glass comprising the tube 1 has a particular malleability or "softness" required for the commencement of a given manipulative operation such as the severing or forming of the glass tube 1 at the portion 5.

One suitable form of servo-mechanism 15 comprises a D.C. servo-motor having a separately excited field winding and an armature winding to which the error signal output 14 from the comparator 10 is applied. The shaft of the servo-motor is connected to the control valve 4, which in this case would be a centrifugal valve which opens to an extent dependent on the rotational speed of the motor.

In another embodiment the servo-mechanism 15 comprises a D.C. servo-motor whose armature winding is connected across a bridge circuit having two power transistors in opposing arms. The error signal output 14 is fed to the power transistors, and according to the sign of said error signal, the direction of rotation of said servo-motor is forward or reverse. The servo-motor is operatively connected to a slide valve constituting the control valve 4 so that the supply of fuel and/or oxygen to the burner 3 is regulated to maintain a given temperature of the portion 5.

In yet another embodiment the oxygen valve supplying the burner may be actuated by a D.C. coil and current through the coil under control of the error signal output 14 positions the oxygen valve at a desired setting. Further the burner may embody a forced air injector with the air feed controlled by a D.C. motor whose field is influenced by the error signal output 14.

When it is desired to terminate the heating of the tube 1 on the portion 5 reaching the requisite temperature, so as to manipulate the tube 1 as mentioned above, the burner 3 may be moved by the servo-mechanism 15 relatively to the tube 1 so that its flame 2 no longer plays on the part 5. With such an arrangement it would not be necessary to provide a control valve 4 in the burner supply.

The pass band of the filter 7 is such that the filter 7 transmit to the sensing device 6 only radiation from the heated portion 5 of the tube 1, radiation from the flame 2 being effectively excluded. Thus there is no interference in the temperature sensing by the device 6, even if the latter "views" the tube 1 through the flame 2. Moreover, since the device 6 senses radiation from the heated portion 5 directly, the heating control effected is potentially more precise than control which is derived from flame or heater temperature, and its precision is not affected by tubes 1 of different thickness or of different types of glass, which necessarily heat to the requisite temperature at different rates.

With water cooling the sensing device 6 may be mounted close to the flame 2; also the device 6 may be used to sense thermal radiation from heated parts of the tube which are not directly subjected to the flame 2. The sensing device 6 can, however, be mounted well away from regions of high working temperature provided the radiation detected thereby is of sufficient magnitude. This aspect of the apparatus according to the invention makes it possible to use the invention for heating control where high temperatures, for example of the order of 1000° C., are involved.

An indicator is provided for monitoring directly the temperature of the heated portion 5 or the energy radiated thereby. In this example the indicator comprises a voltmeter 16 connected to the output of the amplifier 8 and calibrated to indicate the radiant energy emitted by the portion 5.

Figure 2:
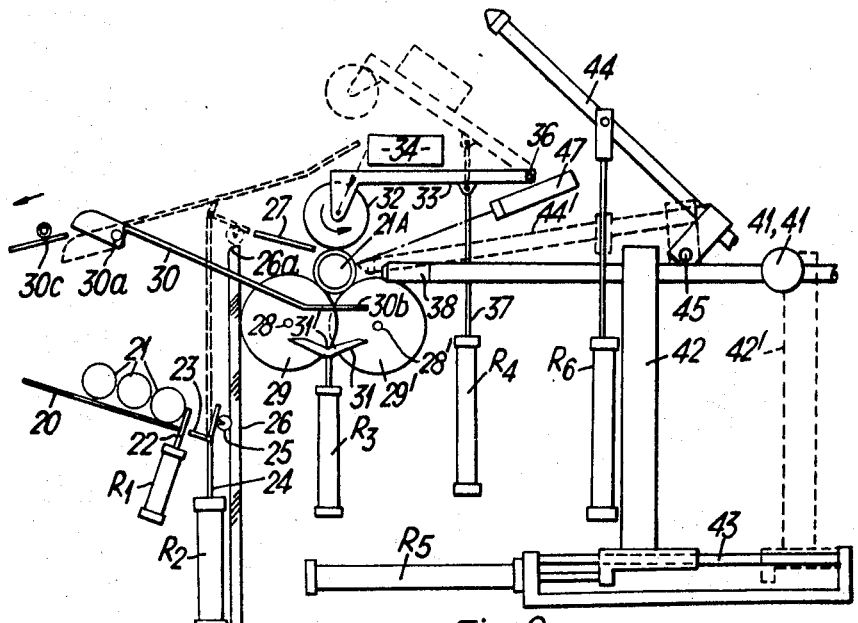
FIG. 2 is a diagrammatic side elevation of a glass spindling machine constructed in accordance with the invention, and illustrated by way of example.
Figure 3:
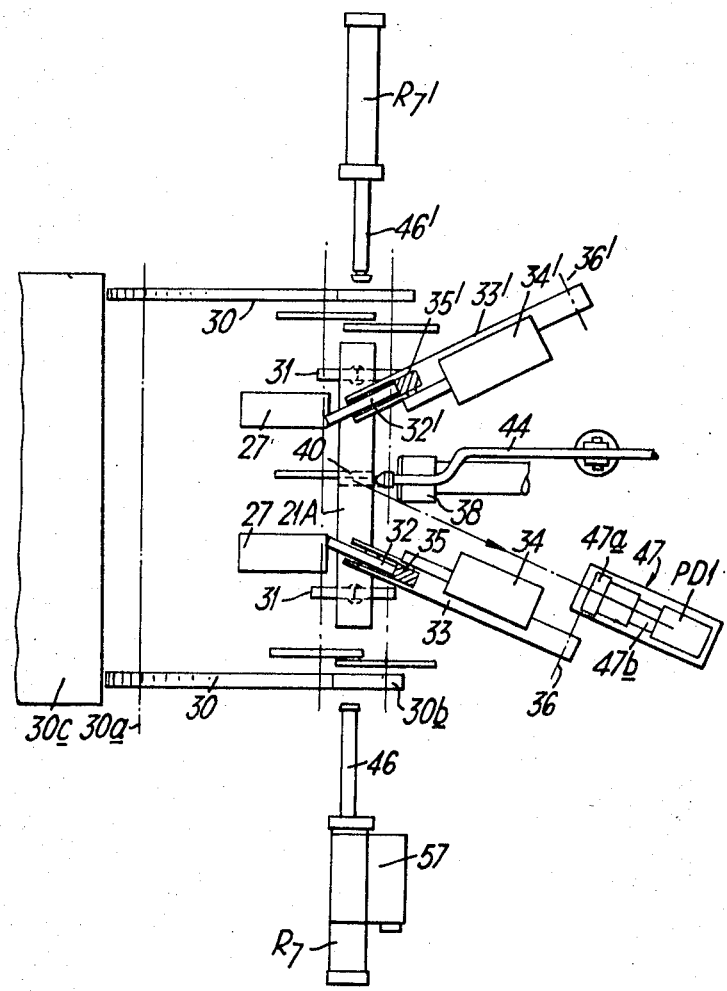
FIG. 3 is a diagrammatic plan view of the machine shown in FIG. 2.
Figure 4:
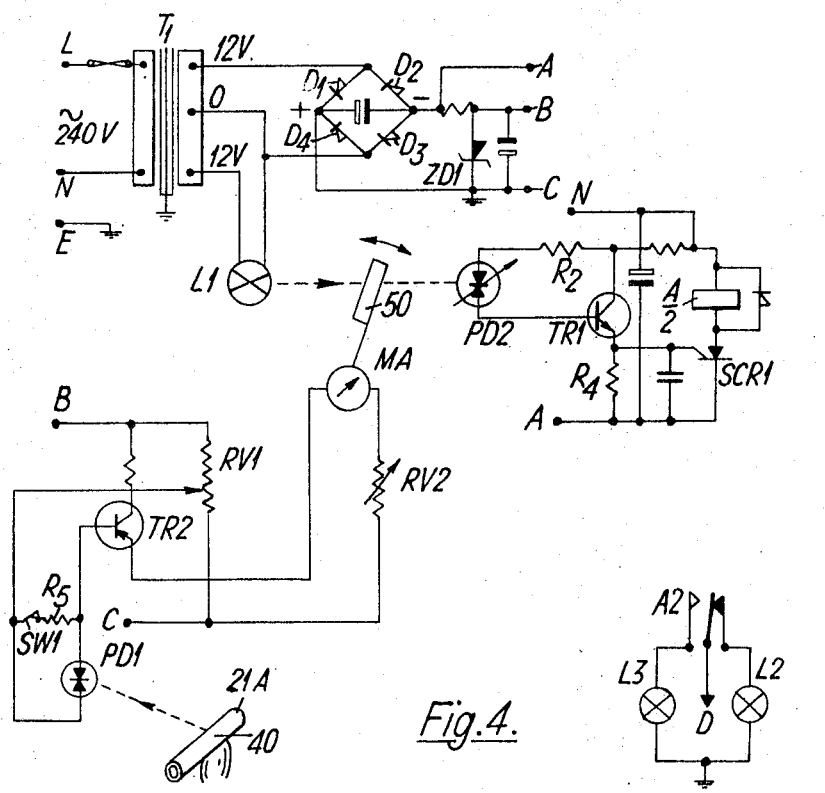
FIG. 4 is a circuit diagram of control means employed with the machine of FIGS. 2 and 3.
Figure 4:
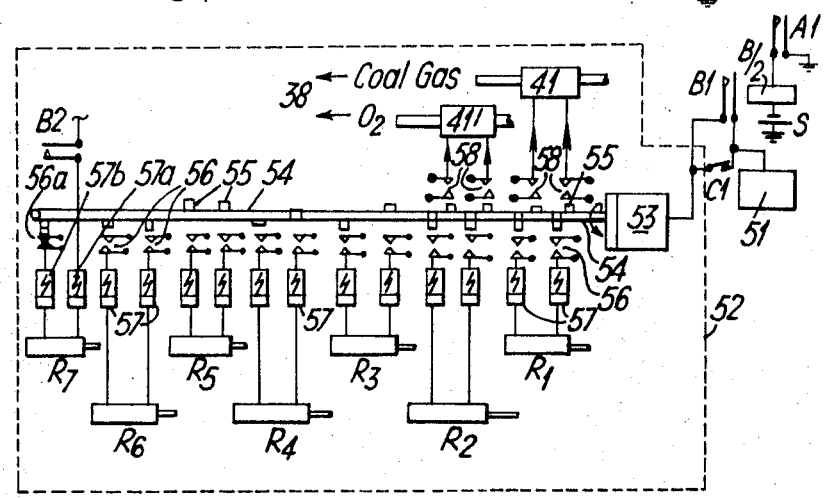

A practical embodiment of apparatus according to the invention is illustrated diagrammatically in FIGS. 2 to 4. The apparatus illustrated is a spindling machine for glass tubing and is designed to draw glass tubes automatically and in continuous sequence into fine glass spindles. This spindling operation may, for example, be an intermediate operation in the manufacture of glass articles.

Referring to FIG. 2, glass tubes for delivery to the machine are stored in a supply chute which includes a sloping input ramp 20 on which tubes 21 are held in juxtaposition ready for delivery to the machine, the lowermost tube resting against a retractable stop 22. The stop 22 is movable between an extended position, in which it is illustrated, and a retracted position by means of an hydraulic ram $R_1$. On retraction of the ram $R_1$ the lowermost tube 21 is permitted to roll on to delivery hods 23 which are pivotally attached to vertically movable rods 24. The rods 24 are movable by means of hydraulic rams $R_2$, each hod 23 being maintained during the initial part of this movement in the orientation shown in full lines by the engagement of a roller 25 on the hod 23 with a vertically extending guide rail 26.

The guide rail 26 terminates at its upper end in a curved surface 26a over which the roller 25 moves when each rod 24 approaches the end of its upward movement, causing the hod 23 to tilt to the position shown in broken lines in which a tube 21 in the hod 23 is tipped on to a fixed delivery ramp 27 over which the tube 21 is delivered to the machine.

The spindling machine has a framework (not shown in the drawings in the interests of clarity) in which two parallel elongated shafts 28, 28' are journalled, the shafts 28, 28' supporting at axially spaced intervals pairs of adjacent idler rollers 29, 29'. The diameter of each roller 29, 29' is greater than the separation of the axes of the shafts 28, 28' so that the nips of the pairs of rollers 29, 29' together define an elongated bed extending parallel to the shafts 28, 28' and disposed mid-way between them (FIG. 2).

Hinged pick-up arms 30 are mounted for rocking movement about horizontal axes 30a above the ramp 20. Each pick-up arm has a slightly turned-up end 30b which, in a lowered position of the pick-up arm, shown in full lines, is disposed beneath the machine bed, and which, in a raised position, shown in broken lines, stops in the opposite direction to the input ramp 20, a fixed output ramp 30c forming a smooth continuation of the arms 30 in their raised positions. The pick-up arms 30 are movable between their lowered and raised positions by engagement of the hods 23 with the undersides of the arms 30 on raising the rods 24.

Disposed beneath the machine bed are a plurality of retractable cradles 31, two only of which are shown, for simplicity, in FIG. 3. Each cradle 31 comprises a forked member defining a V-shaped notch 31' in its upwardly facing surface. Each cradle is movable vertically between a retracted position, in which it is illustrated in FIG. 2 and in which the respective notch 31' is disposed below the machine bed, and an extended position, not shown, in which it is disposed above the machine bed adjacent the discharge end of the delivery ramp 27. The cradles 31 are extended and retracted in unison by respective hydraulic ramps $R_3$. When the cradles 31 are in their extended positions a tube 21 may be delivered over the ramp 27 and received in the notches 31' of the cradles 31; retraction of the cradles 31 by the rams $R_3$ then causes the tube 21 to be lowered on to the machine bed, in which it lies in line contact with the respective pairs of idler rollers 30, 30'. A tube is illustrated in its working position on the machine bed at 21A in FIG. 2.

Two drive rollers 32, 32' are disposed at axially spaced positions above the machine bed, each being rotatably mounted in a respective hinged arm 33, 33' (FIG. 3) and being driven by a respective electric motor 34, 34' mounted on said arm by way of a respective friction wheel 35, 35' in driving engagement with the periphery of the roller 32, 32'. The axes of rotation of the respective drive rollers 32, 32' are inclined at equal angles to the axes of the shafts 28, 28' and, therefore, to the direction of the machine bed, the sense of said inclination being such, in relation to the directions of rotation of the respective rollers 32, 32', that when the rollers are in frictional driving contact with the tube 21A on the machine bed an outward axial component of force is imparted to the tube 21A by each roller 32, 32', as well as a rotational drive in the same sense (i.e. clockwise as viewed in FIG. 2). Each arm 33, 33' is hinged about a horizontal axis 36, 36' and is movable about said hinge between a lowered position, shown in full lines in FIG. 2, in which the respective roller 32 is in driving engagement with the tube 21A, and a raised position, shown in broken lines, in which the roller 32 is out of engagement with the tube 21A. The arms 33, 33' are movable in unison between said positions by respective hydraulic rams $R_4$ having vertically movable actuating rods 37 which are engaged pivotally with the arms 33, 33' between their hinge axes and the respective drive rollers 32, 32'.

A coal gas-oxygen main burner 38 is mounted on one side of the machine bed and is arranged to direct a flame on to a central portion 40 of the tube 21A (FIG. 3). Solenoid-operated regulating valves 41, 41' (one only of which is shown in FIG. 2) are provided in the gas and oxygen supply lines to the burner 38. The burner 38 is mounted on a movable post 42 which is supported in a horizontal slideway 43 and movable laterally thereon from the position in which it is shown, in full lines, to a position shown in broken lines at 42' under the control of a horizontally disposed hydraulic ram $R_5$. When the ram $R_5$ is retracted the post 42 occupies the full line position and the main burner 38 is in its operative position, as shown, in which it is adjacent the central portion 40 of the tube 21A; when the ram $R_5$ is extended, the post 42 occupies the broken line position and the main burner 38 is withdrawn.

A parting burner 44 is also supported on the post 42 for rocking movement about a horizontal axis 45 extending parallel to the axis of the machine bed. Rocking movement of the burner 44 about said axis 45 is effected by an hydraulic ram $R_6$ which is vertically mounted on the post 42, the burner 44 having an inoperative position in which it is raised clear of the machine bed, as shown in full lines, and an operative position, shown in broken lines at 44', into which it is lowered by retraction of the ram $R_6$.

Retractable end stops 46, 46' are provided at each end of the machine bed, the stops being extendable and retractable towards and away from each other in unison by respective hydraulic rams $R_7$, $R_7'$ (FIG. 3). When the stops 46, 46' are retracted, they are clear of the tube 21A on the machine bed, but when extended they are adapted to engage the ends of the tube 21A to prevent outward spindling movement thereof, as hereinafter described.

A photo-electric sensing head 47 is adjustably mounted on the framework of the machine and is aligned with the heated portion 40 of the tube 21A. The sensing head 47 comprises a photocell PD1 on to which radiation from the heated portion 40 is focussed by a lens system 47a (FIG. 3), an infra-red filter 47b being interposed between the photocell PD1 and the lens system 47 so as to admit to the photocell only infrared radiation within a wavelength band approximately 7,000 to 10,000 angstrom units.

A typical control circuit in which the photocell PD1 is connected is illustrated diagrammatically in FIG. 4. The photocell PD1, which comprises an NPN diffused silicon photo-diode, is connected in the base input line of a single transistor amplifier TR2 which is connected to 12 volt stabilised D.C. power supply terminals BC, the bias potential applied to the base of transistor TR2 through the photocell PD1 being adjustable by means of a potentiometer RV1 connected across the terminals BC. A D.C. milliammeter MA (0–1 ma.) is connected in the emitter lead of the transistor TR2 in series with a variable resistor RV2 and is calibrated to provide a direct reading of the radiant energy level, in milliwatts per centimeter$^2$, of the heated portion 40 of the tube 21A. Calibration of the meter MA is effected by switching into the input line of the transistor amplifier TR2, by closing a test switch SW1, an accurately known resistance $R_5$ in shunt with the photocell PD1, and trimming the circuit to achieve accurate proportionality between the reading of the meter MA and the incident radiant energy by means of the potentiometer RV1; the variable resistance RV2 provides an adjustment for calibration of the meter MA to give 1 ma. full-scale-deflection.

A shutter member, indicated diagrammatically at 50, is attached to the movable pointer of the milliammeter MA and is arranged to move into the path of light emitted by an electric lamp L1 and directed on to a second photocell PD2, also comprising a silicon photodiode. The photocell PD2 is adjustable in position relative to the lamp L1, as indicated by the arrow through the cell PD2, so that the light from the lamp L1 may be cut off by the shutter member 50 at any desired reading of the meter MA and, therefore, at any predetermined intensity of the incident thermal radiation from the heated portion 40. The photocell PD2 is connected in series with a high resistance $R_2$ in the base input line to a transistor TR1 connected as an emitter follower and having an emitter load $R_4$. The control line of a solid state switching element SCR1, comprising a silicon controlled rectifier, is connected to the emitter of the transistor TR1, the switching element SCR1 being connected in series with a master relay A/2 across supply terminals NA.

The master relay A/2 has operatively associated therewith two sets of contacts $A_1$, $A_2$. Contacts $A_1$, which are normally open, are the main initiating contacts and, when closed by energisation of the relay A/2, they cause energisation of a relay B/2 by a power source S. The relay B/2 has two sets of contacts B1 and B2, which are normally open. The contacts B1 close, when the master relay is energised, and connect a power supply 51 to a mechanical programming unit 52, initiating operation of the latter by energising an electric motor 53 which drives a cam shaft 54. A plurality of cam members 55 is mounted on the cam shaft 54 at axially spaced intervals and at preset relative angular positions. Each cam member 55 is associated with a respective pair of normally open electrical contacts 56, which are closed by engagement of the respective cam member 55 therewith at a predetermined angular position of the cam shaft 54. The contacts 56 in turn control the power supply to respective solenoid-operated hydraulic valves 57 which are connected in an hydraulic fluid circuit controlling the rams $R_1$–$R_6$. The valves 57 are grouped in pairs, each pair being associated with a different respective ram $R_1$–$R_6$ and the valves 57 of each pair being connected in the fluid supply lines to opposite sides of the respective rams $R_1$–$R_6$, as illustrated diagrammatically. When a respective valve 57 is opened by energisation of its associated solenoid on closure of its respective contacts the associated ram $R_1$–$R_6$ is extended or retracted as the case may be.

The ram $R_7$ is controlled by two solenoid-operated hydraulic valves 57a and 57b. The valve 57a is controlled by the second pair of contacts B2 of the relay B/2, while the valve 57b is controlled by normally-open, cam-operated contacts 56a, similar to the contacts 56.

The programming unit 52 includes a normally-closed set of contacts C1 connected in parallel with the contacts B1, and the contacts C1 are opened by a cam on the cam shaft 54. For the sake of clarity the contacts C1 are shown adjacent the contacts B1 and not in their actual position adjacent the cam shaft 54. Power is normally supplied to the motor 53 through the contacts C1 after operation of the programming unit 52 has been initiated by the closing of the normally-open contacts B1.

Two further pairs of cam-operated contacts 58 control the opening and closing of the coal gas and oxygen regulating valves 41, 41' respectively.

The motor 53 is a constant speed motor, so that, by suitably positioning the cam members 55 on the cam shaft 54 the programming unit 52 can be made to cause actuation of the respective rams $R_1$–$R_6$ and of the regulating valves 41, 41' in either sense in any desired time sequence on energisation of the master relay A/2.

The relay contacts $A_2$ are operative when the master relay A/2 is energised to extinguish an indicator lamp L2 and illuminate an indicator lamp L3.

The power supplies for the circuit of FIG. 4 are derived from A.C. 240 volt mains (terminals LNE) in a conventional manner using a step-down transformer T1 and full-wave rectifier D1–D4. The stabilised D.C. (12 volts) across terminals BC for the transistor TR2 is derived from a Zener diode ZD1.

The operation of the automatic spindling machine shown in FIGS. 2 to 4 will be apparent from the foregoing description. When the heated portion 40 of a glass tube 21A being heated on the machine bed reaches a predetermined radiant energy level, consistent with the requisite viscosity of the semi-molten glass for the spindling operation, shutter member 50 of the milliammeter MA reaches a position, in accordance with the presetting of the photocell PD2, at which light incident on said photocell PD2 from the lamp L1 is interrupted: the impedance of the photocell PD2 changes dramatically, and the resultant change in the output from the emitter follower transistor TR1, triggers the switching element SCR1 into conduction, the master relay A/2 is energised, and through its contacts A1 the relay B/2 is energised. Contacts B2 close so that the valve 57a opens and the rams $R_7$ and $R_7'$ retract withdrawing the end stops 46, 46' which have been in engagement with the ends of the heated tube 21A. The inclined drive rollers 32, 32' in engagement with the tube 21A cause the tube 21A to elongate, drawing out a spindle in the semi-molten heated central portion 40.

When the master relay A/2 is energised the contacts B1 of relay B/2 close, initiating operation of the programming unit 52. The cam members 55 of the programming unit 52 are arranged to cause the following timed sequence of operations; when the programming unit is so energised:

(1) Ram $R_5$ extends, withdrawing the post 42 to the broken line position, and removing the main burner 38 from the vicinity of the heated tube 21A;

(2) Valve 21' of the main burner supply is shut off, cutting off the oxygen supply to the main burner 38;

(3) Valve 21 of the main burner supply is partially closed, diminishing the gas pressure, and reducing the size of the main burner flame while the burner is withdrawn;

(4) Ram $R_6$ retracts, lowering the parting burner 44 into the broken line position 44'. The semi-molten heated portion 40 of the tube 21A is severed centrally, leaving two tubular spindles, which have been formed on the machine bed;

(5) Ram $R_6$ extends, raising the parting burner 44 again;

(6) Rams $R_4$ extend, raising the arms 33, 33' and lifting the drive rollers 32, 32' out of engagement with the spindled tube and clear of the machine bed (broken line position);

(7) Rams $R_3$ extend, raising the cradles 31 and thereby lifting the formed spindles off the machine bed rollers 29, 29';

(8) Ram $R_1$ retracts, permitting a tube blank 21 to roll from the input ramp 20 on to the hods 23;

(9) Ram $R_1$ extends, causing the stop 22 to arrest the next tube 21 on the ramp 20;

(10) Rams $R_2$ extend, raising the hods 23 to the positions shown in broken lines in FIG. 2, at which the tube blank 21 loaded therein is discharged on to the ramp 27. At the same time, the rising hods 23 engage the pick-up arms 30, lifting them to the positions shown in broken lines. The rising arms 30 lift the spindled tubes 21A off the cradles 31, and deliver them to the output ramp 30c, the incoming tube blank 21 having in the meantime rolled down the ramp 27 on to the cradles 31;

(11) Rams $R_3$ retract, lowering the cradles 31 and depositing the tube blank 21 on to the machine bed rollers 29, 29'.

(12) Rams $R_7$, $R_7'$ extend, moving the end stops 46, 46' inwardly to engage the ends of the tube blank 21 on the machine bed;

(13) Rams $R_4$ retract, lowering the arms 33, 33' so that the drive rollers 32, 32' engage the upper surface of the tube blank 21;

(14) Ram $R_5$ retracts, moving the main burner 38 into its operative position (full lines);

(15) Valves 41, 41' open, increasing the gas pressure and admitting oxygen to the main burner 38. Heating of the tube blank 21 commences, and detection of the infra-red radiation from the heated portion 40 of the tube blank commences. At the same time switch C1 is opened by a cam on the cam shaft 54 thereby cutting off the power supply to the motor 53 and the programming unit is stopped.

The cycle of events described above then repeats itself when the radiation from the heated portion, as detected by the sensing head 47, reaches the preset level. It will be noted that while the end stops 46, 46' are in engagement with the tube 21A the spindling operation is prevented, and the operation of the machine may be halted safely at any time up until separation of the end stops 46, 46', that is, at any time while the indicator lamp L2 is on. Thus the machine has an inherent "fail-safe" characteristic while each tubular blank is being heated to the requisite forming temperature.

I claim:

1. Apparatus for manufacturing articles from blanks of material, said apparatus comprising a bed for receiving a blank, means for heating said blank on said bed, manipulating means associated with the bed for manipulating a heated blank, a radiation sensing device disposed so as to receive thermal radiation emitted by a said blank on the bed, said sensing device including a band pass filter in front of the sensor of said sensing device, which filter is constructed to pass only radiations in the wave-length band of 7,000 to 10,000 angstrom units to said sensing device, and actuator means connected to the manipulating means and the heating means and coupled to the output of the sensing device and including signal discriminating means responsive to a predetermined magnitude of a signal output from the sensing device to initiate automatically a manipulative operation on the heated blank or to adjust the rate of heating thereof.

2. Apparatus as claimed in claim 1, including indicator means coupled to the output of the sensing device for monitoring continuously the said signal to provide an indication of the radiant energy level of the heated material.

3. Apparatus as claimed in claim 1, in which said actuator means includes a displaceable shutter member, a light source, a photo-cell aligned with said light source, means coupled to the output of the sensing device to displace the shutter member by an amount proportional to the magnitude of said signal from an initial position outside the path between said light source and said photo-cell to a position interposed between the light source and the photo-cell, and means to adjust the relative positions of the shutter member and the path of a beam between the light source and the photocell whereby the shutter member occupies a cut-off position between the source and the photo-cell when said signal has said predetermined magnitude.

4. Apparatus as claimed in claim 1, in which the said radiation sensing device comprises a photoelectric device adapted to produce an electrical signal, and the actuator means includes an electrical relay circuit.

5. Apparatus as claimed in claim 4, in which said electrical relay circuit includes an electromechanical master relay, an energizing line for the relay, a solid state switching element in the energizing line and at least one transistor having its input connected to the output from the photoelectric device connected to the solid state switching element.

6. Apparatus as claimed in claim 5, in which the actuator means further includes a plurality of actuators, each operatively connected to a different part of the apparatus and controlled by a common programming unit which is connected to said master relay and adapted to be set in operation by operation of said relay in response to said predetermined magnitude of said signal, to actuate said parts in a predetermined sequence.

7. Apparatus as claimed in claim 6, in which said actuators comprise respective double-acting fluid pressure rams for performing mechanical operations controlled by respective pairs of solenoid-operated valves which are controlled by said programming unit.

8. Apparatus as claimed in claim 7, in which the programming unit comprises a driven rotary cam shaft, a plurality of cams disposed on the shaft at predetermined angular positions thereon and respective electrical contacts arranged to be operated by the cams and connected to respective said solenoid valves in said predetermined sequence on operation of said master relay.

9. Apparatus as claimed in claim 1, for forming cylindrical blanks of vitreous material into spindles and including drive rollers arranged to drivingly engage a blank on said bed at axially spaced positions with their axes of rotation inclined in opposite senses to the axis of the blank, so that when the blank is rotated about its axis its ends are urged apart by said rollers.

10. Apparatus as claimed in claim 9, in which retractable stops coupled to and controlled by the output of the programming unit are provided on said bed for engaging opposite ends of a blank on the bed to prevent spindling of the blank by said rollers, wherein the stops are automatically retracted to permit spindling of the blank by the actuator means when said signal reaches said predetermined magnitude.

11. Apparatus as claimed in claim 1, in which the actuator means includes means for removing a formed blank from the bed and for automatically replacing it by a further blank in timed sequence to the occurrence of a signal of said predetermined magnitude.

12. Apparatus as claimed in claim 1, in which the heating means is mounted for movement relatively towards and away from the said bed, said actuator means being adapted to move the heating means away from the bed in timed sequence to the occurrence of a signal of said predetermined magnitude.

13. In apparatus for shaping a blank of vitreous material which is deformable upon being heated, in combination; means for holding the blank while being heated; a burner adapted to direct flame against that portion of the blank which is to be heated; photoelectric sensing means for receiving thermal radiation from said portion of the blank being heated; said sensing means including a band pass filter between the sensor of said sensing means and the portion of the blank being heated, which filter is constructed to pass to said photoelectric sensing means only radiations in the wave-length band of 7,000 to 10,000 angstrom units; and means controlled by said sensing means for shaping said blank when sufficiently heated.

14. In apparatus according to claim 13 wherein said blank is a glass tube;
said means controlled by said sensing means including stop members engaging the opposite ends of said tube;
drive means for simultaneously rotating said tube and urging those portions on opposite sides of said portion being heated toward their respective stop members; and
means for retracting said stop members in response to a predetermined signal from said sensing means.

References Cited

UNITED STATES PATENTS

| | | | |
|---|---|---|---|
| 3,257,188 | 6/1966 | Morgan et al. | 65—107 |
| 2,150,017 | 3/1939 | Barnard | 65—161X |
| 2,682,802 | 7/1954 | Fedorchak et al. | 65—158X |
| 3,079,774 | 3/1963 | Yuder | 65—162X |
| 3,268,318 | 8/1966 | Murley Jr. | 65—158 |
| 3,332,765 | 7/1966 | Champlin | 65—162 |

FOREIGN PATENTS 687,843    6/1964    Canada    65—158

FRANKLIN W. MIGA, Primary Examiner

U.S. Cl. X.R.

65—29, 109, 374